3,850,907
LIPASE-INHIBITOR EXTRACTED FROM *ARACHIS HYPOGEA, BRASSICA NAPUS* VAR. *ARVENSIS* OR *PAPAVER SOMNIFERUM* AND A PROCESS FOR EXTRACTION
Eugen Werle, Karl Hochstrasser, and Herbert Feuth, Munich, Germany, assignors to Bayer Aktiengesellschaft, Leverkusen, Germany
Filed May 11, 1973, Ser. No. 359,260
Claims priority, application Germany, May 26, 1972, P 22 25 647.9
Int. Cl. C07g 17/00
U.S. Cl. 260—236.5                          6 Claims

ABSTRACT OF THE DISCLOSURE

A novel lipase-inhibitor is disclosed, as well as processes for its extraction from seeds rich in fats, preferably *Arachis hypogea, Brassica napus* var. *arvensis*, and *Papaver somniferum*, and to its use as a medicine, especially for example, in the treatment of pancreatic inflammation and for the prevention of necroses of adipose tissue.

BACKGROUND OF THE INVENTION

A variety of lipase-inhibitors are already known in the literature as, for example, those disclosed by K. Dietmann and W. Jukran, Naunyn-Schmiedeberg Arch. Exp. Pathol. Pharmacol. 269, 467 (1971); B. May and L. Leinweber, Naunyn-Schmiedeberg Arch. Exp. Pathol. Pharmacol. 269, 467 (1971); N. Klissiunis and M. Mykoniats, Naunyn-Schmiedeberg Arch. Exp. Pathol. Pharmacol. 269, 469 (1971); F. H. Mattson, R. A. Volpenhein and L. Benjamin, J. Biol. Chem. 245, 5335 (1970); G. Benzonana and P. Desnuelle, Biochim. Biophysica Acta Amsterdam 164, 4747 (1968); P. Desnuelle, M. I. Constantin and L. Sarda, Bull. Soc. Chim. Biol. 38, 625 (1956); D. K. Myers, A. Schotte, H. Boer and H. Borsje-Bakker, Biochem. J. 61, 521 (1955); G. Gomorie, J. Lab Clin. Med. 42, 445 (1953); G. Gomori, Am. J. Clin. Pathol. 27, 170 (1957); G. A. Overbek, Clin. Chim. Acta 2, 1 (1957); R. I. Henry, C. Sobel and S. Berkman, Clin. Chem. 3, 77 (1957); H. Brockerhoff, Biochim. Biophysica Acta Amsterdam 159, 296 (1968).

Most of the lipase-inhibitors described above were prepared synthetically and little is known whether or not they can be used in a medical sense, especially in the treatment of pancreatic inflammation or for the prevention of necroses of adipose tissue.

Accordingly, it is an object of this invention to produce a novel lipase-inhibitor extract from seeds rich in fats which is particularly adapted for use as a medicine.

A further object of this invention resides in the provision of a novel process for the extraction of a novel lipase-inhibitor from the seeds of *Arachis hypogea, Brassica napus* var. *arvensis* and *Papaver somniferum* and the medicinal use thereof in the treatment of inflammations of the pancreas and for the prevention of necroses in adipose tissue.

These and other objects of the invention will become further apparent from the following description thereof.

THE PRESENT INVENTION

It has now been discovered that a new lipase-inhibitor can be obtained by extraction of seeds rich in fat with an organic solvent. Furthermore, it has been found that the new lipase-inhibitor can be used as a medicine.

In accordance with an embodiment of this invention, there is provided a new lipase-inhibitor containing myristic, palmitic and oleic acids esterified with a polyalcohol, yielding the methyl esters of myristic, palmitic, and oleic acids on methanolysis, and yielding myristic, palmitic and stearic acids on hydrogenation.

The three acids liberated as the methyl esters from the new lipase-inhibitor by methanolysis can be detected by gas chromatography.

The lipase-inhibitor according to the invention is monomolecular. It differs from the fats in that it inhibits the enzyme lipase, the inhibition occurring immediately after mixing the enzyme and inhibitor. The inhibitor exerts this inhibition permanently; even with an excess of lipase, a decline in the inhibiting action during a prolonged incubation period cannot be observed. The inhibiting action disappears after alkaline hydrolysis, while hydrogenation does not lead to the loss of the inhibitor property.

Figure 1A:
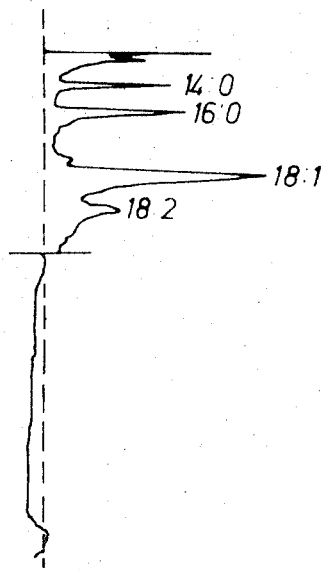
FIG. 1 shows the gas chromatograms of the fatty acid methyl esters obtained after methanolysis of the inhibitor, as extracted (a) and as hydrogenated (b) respectively.

Surprisingly, the inhibitor according to the invention is more strongly active than the already known inhibitors for lipases and surprisingly it can be isolated in a simple manner from seeds rich in fat. Furthermore, this starting material is cheaper and much more easily accessible than the starting materials for the synthesis of lipase inhibitors.

A further embodiment of this invention is directed to a process for the extraction of a lipase-inhibitor from seeds rich in fat comprising steps of:

(i) contacting the seeds with a lipid solvent to produce an extract;
(ii) optionally evaporating the extract to form a concentrate;
(iii) fractionating the concentrate by chromatography and selecting the fraction or fractions highest in lipase-inhibiting activity.

Preferred seeds rich in fat are those of *Arachis hypogea* (groundnuts), *Brassica napus* var. *arvensis*, and *Papaver somniferum*. Substantially any lipid solvent can be used to produce an extract but acetone, ether, petroleum ether, carbon tetrachloride, glacial acetic acid and trichloroethane are preferred lipid-solvents.

The extraction is generally carried out at room temperature (i.e. 15–25° C.) with agitation, and generally lasts at least three hours.

Partition chromatography and chromatography in a counter-current column can be used for the chromatography of the crude concentrate, which, for this purpose, is preferably re-dissolved in a lipid-solvent suitable for chromatography. Suitable stationary phases are, for example, transversely cross-linked polydextrans, silicates and silica gel.

Each fraction is tested and those with the best inhibiting action are selected and again chromatographed. Finally an oily product which chromatographically is a single substance, is obtained.

The inhibitor according to the invention can be used medicinally. It displays strong lipase-inhibiting effects and is suitable for the treatment of acute, sub-acute and chronic inflammations of the pancreas, analogously to the treatment of acute pancreatitis with kallikrein-trypsin inhibitor, especially for the prevention of adipose tissue necroses in the region of the abdominal cavity and its organs, which can be the cause of intestinal obstruction or of peritonitis.

Thus, another embodiment of the invention resides in the provision of a pharmaceutical composition containing as an active ingredient the new lipase-inhibitor, mixed with an inert pharmaceutically acceptable diluent or carrier. Examples of suitable diluents and carriers are pharmaceutically acceptable lipid solvents and suspending media in which the lipase-inhibitor can form a suspension or emulsion, specifically, for example, water (usually in the presence of an emulsifying agent), ethanol, isopropanol, propylene glycol, glycerol, dimethyl formamide, and polyalkylene glycols such as polyethylene glycol.

A preferred pharmaceutical composition according to the invention is a sterile injectable solution, emulsion or suspension of the new lipase-inhibitor.

Yet another embodiment of the invention resides in the provision of a medicament in dosage unit form comprising the new lipase-inhibitor. The expression "medicament in dosage unit form" as used in this specification means a discrete, coherent article containing a predetermined individual quantity of the inhibitor, the said quantity being such that one article or a conveniently small number of articles, for example up to ten, are required for a single therapeutic administration.

Specific examples of medicaments in dosage unit form according to the invention are tablets, pills, dragees, capsules, ampoules and suppositories each containing the new lipase-inhibitor. A preferred medicament in dosage unit form is ampoules containing an injectable solution, suspension or emulsion of the inhibitor.

The new lipase-inhibitor can be administered in the customary manner, especially by intravenous, intraperitoneal, intramuscular and subcutaneous administration once or several times a day as an injection, as an infusion, or for flushing the abdominal cavity. A dosage rate of 0.5–500 mg. per patient daily is envisaged but it may be necessary to go outside this range to secure particular results or in view of the condition of the patient.

Still another embodiment of the invention resides in the provision of method for combatting pancreatic inflammation and adipose tissue necroses in human and non-human animals which comprises administering to the animals the new lipase-inhibitor, either alone or mixed with a diluent or in the form of a medicament in dosage unit form as defined above.

A further possible application of the new inhibitor is the preservation of fat-rich foodstuffs, for example fats and oils. These may be preserved according to the invention by adding to them an effective quantity of the new lipase-inhibitor.

The following Example will serve to illustrate the process of extraction according to the invention of the new lipase-inhibitor and demonstrate its properties.

EXAMPLES

1. Isolation of the lipids 1,000 g. portions of ground groundnuts are thoroughly stirred with 1 liter of acetone for five hours. Instead of groundnuts, the seeds of *Brassica napus* var. *arvensis* or of *Papaver somniferum* can be used in exactly the same manner. The acetone extract is freed of solid particles by filtration and the solvent is removed *in vacuo*. The acetone-free lipids were used for the investigation.

2. Demonstration of anti-lipolytic activity

A lipase substrate was prepared by homogenizing 0.5 g. of sodium benzoate, 18.5 g. of gum arabic, and 250 ml. of water, adding 250 ml. of olive oil, and homogenizing for another five minutes. Lipid emulsions are analogously prepared from the lipids and lipid fractions to be tested for inhibiting activity. Before use, the substrate and a 0.05 M tri-sodium phosphate incubation buffer are mixed in a ratio of 1:1 vol:vol. The determination of the lipolytic action or of its inhibition is carried out by titration of the fatty acids liberated from the substrate by the lipase. However, the substrate emulsion and the inhibitor emulsion can contain titratable acidity. Hence, substrate and inhibitor blank tests must be carried out at the same time. The following batches were prepared:

1. Substrate blank: 10 ml. of substrate-buffer mixture + 1 ml. of thymolphthalein.
2. Lipid blank: 10 ml. of emulsion-buffer mixture + 1 ml. of thymolphthalein.
3. Lipase standard: 2 mg. of enzyme in 2 ml. of water, 10 ml. of substrate-buffer mixture.
4. Inhibition batch: 2 mg. of lipase in 2 ml. of water, 10 ml. of substrate-buffer mixture, 5–10 ml. of lipid emulsion.

The batches are incubated for 30 minutes at 37° C. and after the addition of thymolphthalein solution the fatty acids liberated in each batch are titrated against 0.05 N NaOH.

Evaluation (i) Lipase action = titration batch 3 minus titration batch 1.
(ii) Inhibiting action = titration batch 4 minus (titration batch 1 plus batch 2).

An inhibiting action exists if the value (i) is greater than the value of (ii).

Inhibition can be expressed as percentage inhibition achievable by the amount of lipid employed as follows:

$$\text{Inhibition (percent)} = 100 - \frac{100 \times \text{(ii)}}{\text{(i)}}$$

3. Isolation of the inhibiting substance

Preliminary experiments by thin layer chromatography were carried out to determine the most favorable separation conditions in the column process. In a series of solvents and solvent mixtures which were investigated, the mixture of petroleum ether/diethyl ether/acetic acid (volume ratio 9:1:0.1) gave the most differentiated separation. The individual lipids are located under UV after spraying with Rhodamine B.

Column chromatography

Silica gel is equilibrated with petroleum ether/diethyl ether/actic acid (volume ratio 9:1:0.1) and introduced into 5 x 30 cm. glass columns. 50 g. of lipid, dissolved in 50 ml. of solvent, are applied to the column and eluted fractionally in 15 ml. fractions. To locate fractions containing lipid, aliquot amounts from every fifth fraction are applied to thin layer chromatography plates. The same solvent is used for developing, and the lipids located with Rhodamine B. Fractions in which lipids of identical or similar $R_f$ value are found by thin layer chromatography are combined, the solvent is evaporated and the residue is tested for its lipase-inhibiting action as described above under 2. Polar lipids are finally eluted by fractionation with methanol. An inhibiting action was not detectable in these fractions.

Preparative separation of this mixture proves possible by re-chromatography under identical conditions in 5 x 100 cm. columns.

The purity of the product is tested by thin layer chromatography in the solvents petroleum ether/diethyl ether/acetic acid (volume ratio 9:1:0.1); methyl ethyl ketone; acetone; and acetone/methanol (volume ratio 9:1). All $R_f$ values concern the system petroleum ether/diethyl ether/acetic acid.

4. Characterization of the lipid

The presence of a phospholipid was tested for with ninhydrin and phosphotungstic acid. Reactions were negative. The lipase-inhibiting substance cannot be extracted from ether by means of $NaHCO_3$ or HCl. The inhibiting action disappears after alkaline saponification. The fatty acids were identified by gas chromatography after methanolysis of the lipid. The unsaturated fatty acid was determined by gas chromatography after hydrogenation.

The lipid which is active as an inhibitor represents less than 1% of the total amount of lipid extracted from the groundnuts. Chromatographically, it behaves as a single substance in various systems. The same inhibition curves are obtained with the lipase-inhibitor as with crude lipid. The inhibitor contains neither phosphorus nor amine, and alkaline hydrolysis leads to the disappearance of its inhibiting action.

Figure 1B:
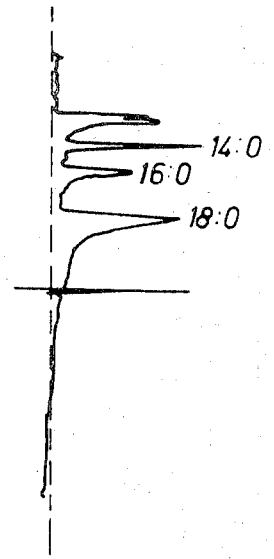
Figure 2:
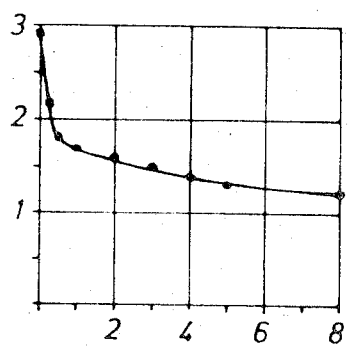
FIG. 2 shows the inhibition of the lipase action by the inhibitor according to the invention. The increasing amounts of the inhibitor emulsion, in ml., are given on the $x$-axis and the fatty acids liberated (=consumption of 0.05 N NaOH) are given on the $y$-axis.

For further characterization, the inhibitor was subjected to methanolysis and the fatty acid methyl ester was identified by gas chromatography. The fatty acids represented by the peaks labeled in FIG. 1 as $C_{14:0}$; $C_{16:0}$ and $C_{18:1}$ were found in approximately equimolar amounts. Chromatography of an aliquot hydrogenated portion allows the fatty acids to be identified as myristic acid, palmitic acid and stearic acid. Hydrogenation of the intact lipid does not lead to a loss of the inhibiting action.

What is claimed is:

1. A process for the production of a lipase-inhibitor containing substance which comprises comminuting the seeds of groundnuts, selected from *Arachis hypogea*, *Brassica napus* var. *arvensis* and *Papaver somniferum* extracting said comminuted seeds by contacting the same with a lipid solvent to form an extract containing a lipase-inhibitor containing substance and recovering said lipase-inhibitor containing substance from said extract.

2. The process of claim 1 wherein the comminuted seeds are agitated in contact with the lipid solvent for a period of time of about three hours at temperatures in the range of from 15–25° C.

3. The process of claim 1 wherein the lipid solvent is a member of the group consisting of acetone, ether, petroleum ether, carbon tetrachloride, glacial acetic acid and trichloroethane.

4. The process of claim 1 wherein said extract is fractionated by diffusion chromatography.

5. The process of claim 4 wherein said extract is fractionated by diffusion chromatography on a stationary phase selected from the group consisting of transversely cross-linked polydextrans, silicates and silica gel.

6. A lipase-inhibitor produced by the process of claim 2.

References Cited

UNITED STATES PATENTS 3,655,886    4/1972    Groebel et al. _____ 260—236.5

OTHER REFERENCES

C.A. 63: 7348e (1965) Shinozaki et al.
C.A. 74: 83395j (1971) Asghar et al.
C.A. 75: 87166d (1971) Grishina et al.

NORMA S. MILESTONE, Primary Examiner

S. D. WINTERS, Assistant Examiner

U.S. Cl. X.R.

424—195; 426—179, 229, 321

UNITED STATES PATENT OFFICE
CERTIFICATE OF CORRECTION

Patent No. 3,850,907            Dated November 26, 1974

Inventor(s) Eugen Werle et al

It is certified that error appears in the above-identified patent and that said Letters Patent are hereby corrected as shown below:

Column 4, line 41 "actic" should be --acetic--.

Column 6, line 11 "claim 2" should be --claim 1--.

Signed and sealed this 8th day of April 1975.

(SEAL)
Attest:

RUTH C. MASON
Attesting Officer

C. MARSHALL DANN
Commissioner of Patents
and Trademarks